Patented Sept. 27, 1927.

1,643,922

UNITED STATES PATENT OFFICE.

NIELS C. CHRISTENSEN, OF SALT LAKE CITY, UTAH.

PROCESS OF PRECIPITATING COPPER FROM SULPHATE SOLUTION.

No Drawing. Application filed March 10, 1924. Serial No. 698,325.

This invention relates to the recovery of copper from copper sulphate solutions. Its object is to recover the copper as a clean precipitate of the metal and at the same time to form a useful compound from the precipitant. The process is especially applicable in connection with chloride process for the treatment of lead ores, or in connection with the manufacture of aluminum chloride.

The process consists in general of precipitating the copper from its sulphate solution with metallic lead forming a precipitate of metallic copper and lead sulphate. This method of precipitation of copper has hitherto not been used owing to the fact that under ordinary conditions this reaction can not be carried on owing to the formation of a coating of lead sulphite which is almost instantly formed on the lead and prevents further action. It has, therefore, been considered impossible to precipitate copper from sulphate solutions with metallic lead. I have found, however, that it is relatively easy to continuously remove the coating from the lead and that a complete precipitation of copper from sulphate solutions with metallic lead can be very easily brought about.

My method of precipitation consists in passing the copper sulphate solution through a tumbling barrel or tube mill containing relatively small pieces of lead, preferably lead marbles or lead shot (made by pouring the molten lead through a screen into water). The grinding (or abrading) action of the pieces of lead in the tumbling barrel removes the coating of lead sulphate as fast as it is formed giving a rapid and complete precipitation of the copper, as indicated below:

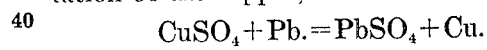
$$CuSO_4 + Pb. = PbSO_4 + Cu.$$

This precipitation is entirely complete if sufficient time is allowed in passing the solution through the tumbler or tube mill.

The resulting precipitate of copper and the fine lead sulphate ground off the lead particles in the tumbler are carried out of the mill in suspension in the barren solution and are easily settled or filtered out of the solution.

The mixed precipitates (copper and lead sulphate) are then treated with a concentrated brine (either NaCl—CaCl$_2$) which dissolves the lead sulphate leaving a clean copper precipitate. This dissolving operation is preferably carried out by using a hot brine in such proportion as to form a relatively concentrated lead solution which (after being separated from the copper precipitate) is cooled and lead chloride precipitated and recovered from the brine.

This lead chloride may be treated in a number of ways for the recovery of the lead for reuse in the process; such as smelting with lime and carbon and forming lead bullion and a calcium chloride slag which may be utilized in dissolving the lead sulphate, or electrolyzing the molten lead chloride and securing lead bullion and chlorine. My preferred method is, however, to heat the dry lead chloride with metallic aluminum to secure the lead as bullion and form anhydrous aluminum chloride.

It is obvious that unless the lead can be cheaply recovered for reuse in the process, that under ordinary conditions, the process could have no wide commercial operation. The recovery of the lead by treating the dry chloride with aluminum, and thus recovering the lead and forming anhydrous aluminum chloride for which a large potential demand exists for use in oil refining, which demand awaits a sufficient supply of the chloride at a reasonable cost.

From the foregoing, it will be seen that my process recovers the copper from sulphate solution in an efficient manner and not only recovers the lead so that it may be reused in the process but also recovers the lead by a method which produces a valuable by-product for which there is a considerable demand.

The precipitation of the copper may also be carried out by lining the tumbling barrel or tube mill with lead and using pebbles therein to grind off the lead sulphate as the copper sulphate solution is passed through the mill, but this method requires the use of a much larger number of precipitating barrels or tube mills owing to the much smaller precipitating surface and slower removal of the lead sulphate.

Having described my process, what I claim and desire to patent is:

1. The process of recovering copper from sulphate solutions, which comprises treating a solution containing copper sulphate with metallic lead, while continuously mechanically removing the coating of lead sulphate formed upon the lead, to thereby precipitate the copper from said solution and to form lead sulphate in admixture therewith, and thereafter separating the mixture by action of a differential solvent.

2. The process of recovering copper from sulphate solution which comprises agitating and tumbling a solution containing copper sulphate with metallic lead so as to continuously grind off the coating of lead sulphate formed on the lead surfaces, and to thereby precipitate copper from said solution and to form lead sulphate, and thereafter separating said two products by action of a differential solvent.

3. The process of recovering copper from sulphate solution, which comprises passing copper sulphate solution through and in contact with a charge of metallic lead in relatively small pieces which is being continuously rotated and tumbled, to thereby precipitate copper from said solution and to form lead sulphate, the tumbling action being vigorous enough to keep the surfaces of the lead pieces sufficiently clean and reactive, and separating the mixture of metallic copper and lead sulphate by action of a differential solvent.

4. The process of recovering copper from sulphate solution, which consists in passing said solution through a tumbling barrel containing a charge of metallic lead shot at least chemically equivalent to the acid ions in the solution, and thereby completely precipitating copper from said solution and forming lead sulphate, and thereafter dissolving the latter.

5. The process of recovering copper from sulphate solutions as a clean precipitate of copper, which consists in treating said solutions with metallic lead so as to obtain a copper precipitate mixed with lead sulphate and thereafter separating said mixture of copper precipitate and lead sulphate from said treated solution and dissolving the lead sulphate away from said copper precipitate with a brine.

6. The process of recovering copper from sulphate solutions and thereafter recovering the precipitant for reuse in the process, which consists in treating said solutions with metallic lead so as to obtain a copper precipitate mixed with lead sulphate and separating the said mixture from said solution and dissolving the lead sulphate away from said copper in a concentrated brine and thereafter recovering the lead from said brine and using it in the treatment of more copper sulphate solution.

7. The process of recovering copper from sulphate solutions and thereafter recovering the precipitant for reuse in said process, which consists in precipitating copper from said solutions with metallic lead and thereby forming lead sulphate, and separating the mixture of precipitated copper and lead sulphate from said solution and dissolving the lead sulphate away from said copper precipitate with a hot concentrated brine and cooling said brine and recovering lead chloride therefrom and recovering the lead from said chloride and using it to precipitate more copper from sulphate solution.

8. The process of recovering copper from sulphate solutions and thereafter recovering the precipitant for reuse in said process, which consists in precipitating copper from said solutions with metallic lead, thereby forming lead sulphate and separating the mixture of precipitated copper and said lead sulphate from said solution and dissolving said lead sulphate away from said precipitated copper.

In testimony whereof I have signed my name to this specification.

NIELS C. CHRISTENSEN.